Oct. 14, 1924.  
H. G. CODER  
COCONUT SHREDDING MACHINE  
Filed July 3, 1923  
1,511,947  
3 Sheets-Sheet 1
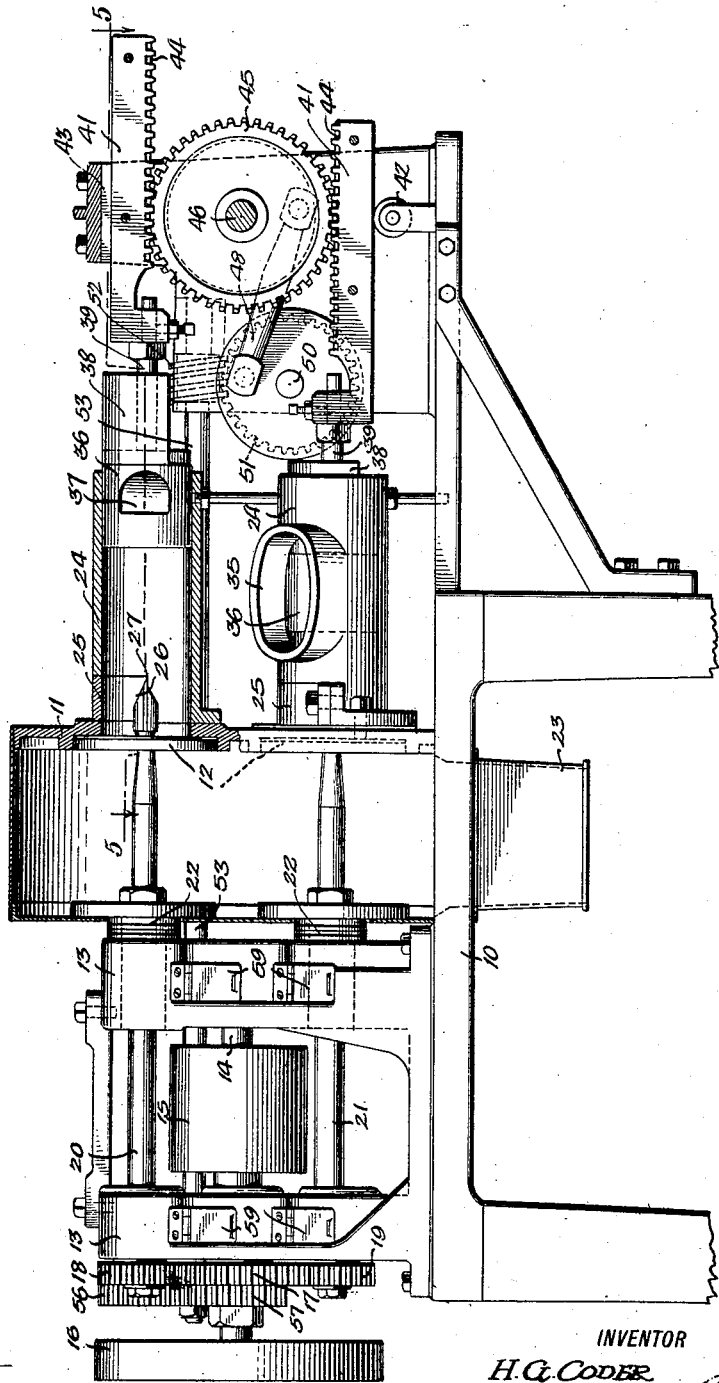
WITNESSES  
INVENTOR  
H. G. Coder  
BY  
ATTORNEYS Oct. 14, 1924.  
H. G. CODER  
1,511,947  
COCONUT SHREDDING MACHINE  
Filed July 3, 1923  
3 Sheets-Sheet 2
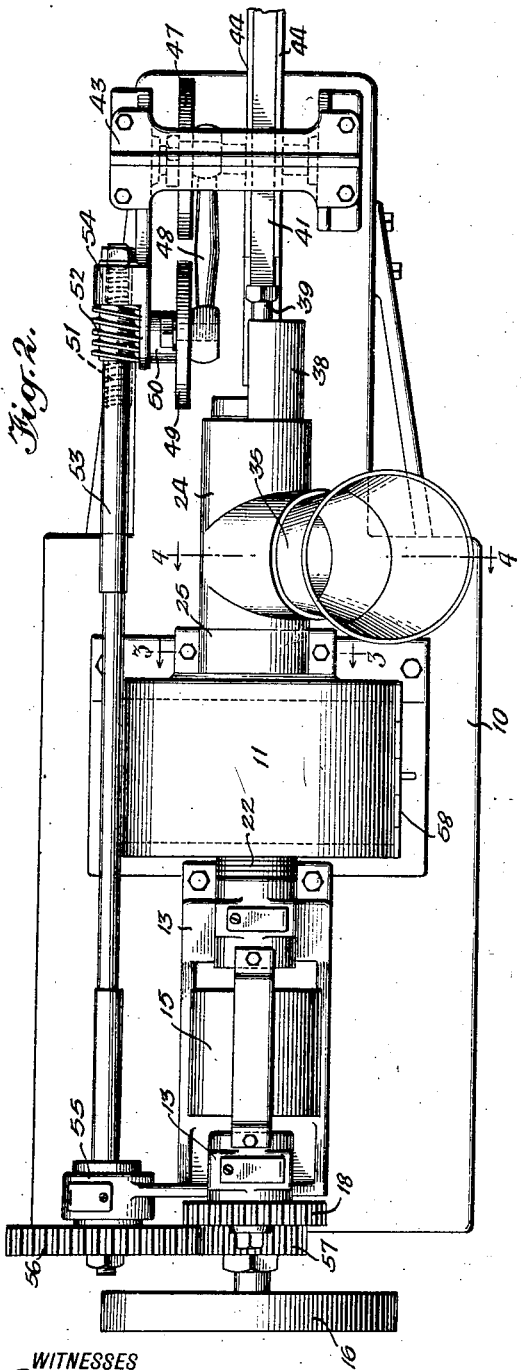
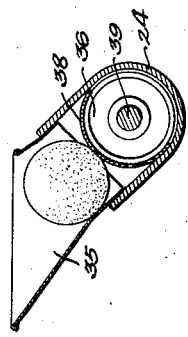
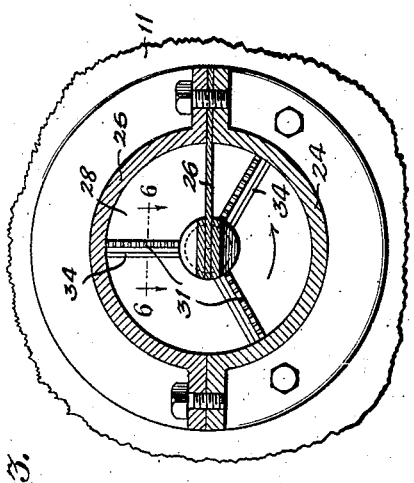
WITNESSES
INVENTOR
H.G.CODER
BY
ATTORNEYS Oct. 14, 1924.
H. G. CODER
1,511,947
COCONUT SHREDDING MACHINE
Filed July 3, 1923
3 Sheets-Sheet 3
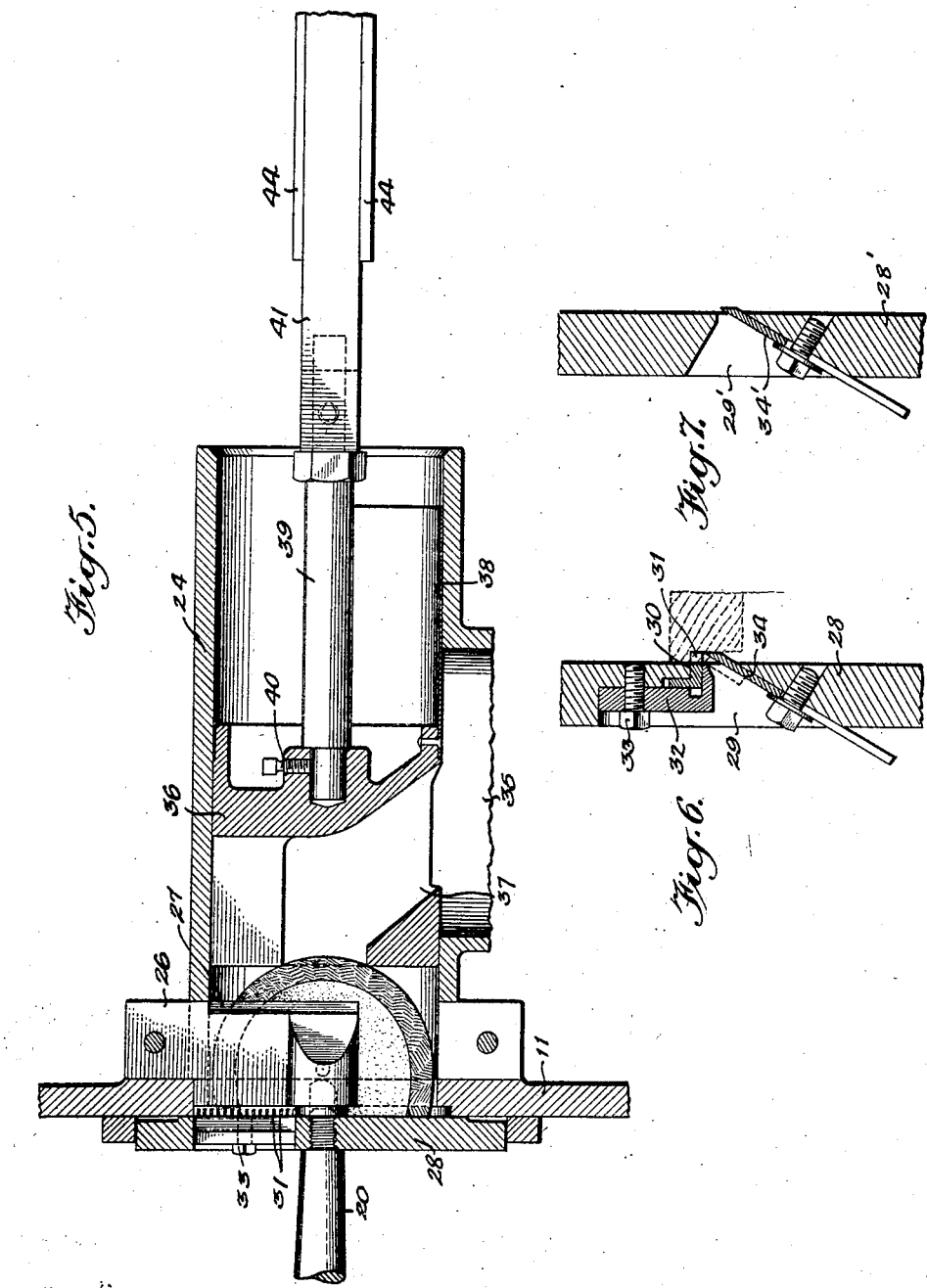
WITNESSES
INVENTOR
H.G.CODER
BY
ATTORNEYS Patented Oct. 14, 1924.

1,511,947

UNITED STATES PATENT OFFICE.

HENRY G. CODER, OF JERSEY CITY, NEW JERSEY.

COCONUT-SHREDDING MACHINE.

Application filed July 3, 1923. Serial No. 649,322.

*To all whom it may concern:*

Be it known that I, HENRY G. CODER, a citizen of the United States, and a resident of Jersey City, in the county of Hudson and State of New Jersey, have invented a new and Improved Coconut-Shredding Machine, of which the following is a full, clear, and exact description.

This invention relates to improvements in coconut shredding machines, and has for one of its objects the provision of a machine of comparatively simple and efficient construction, in which coconuts will be rapidly shredded.

Another object is to provide a machine in which coconuts are alternately fed to a plurality of shredding mechanisms by means of reciprocating feeding members associated with said mechanisms.

Another object is to so construct the machine that only a single coconut will be fed from a hopper to each of the shredding mechanisms upon each actuation of the feeding member associated with said mechanism.

A further object is to control the operation of the feeding members by a mechanism common thereto.

A still further object is to feed a coconut to a shredding mechanism in such manner that as the coconut is being shredded it will be held against movement similar to that imparted to said mechanism.

The above and other objects will appear more clearly from the following detail description, when taken in connection with the accompanying drawings, which illustrate preferred embodiments of the inventive idea.

In the drawings—

Figure 1 is a fragmentary side elevation, partly in section, of the machine constructed in accordance with the invention;

Figure 2 is a top plan view thereof;

Figure 3 is a section on the line 3—3 of Figure 2;

Figure 4 is a section on the line 4—4 of Figure 2 with the feeding member in its operated position;

Figure 5 is a section substantially on the line 5—5 of Figure 1, illustrating the manner in which a coconut is fed to the shredding mechanism;

Figure 6 is a section on the line 6—6 of Figure 3 showing the operation of the shredding mechanism; and Figure 7 is a view similar to Figure 6 showing a slightly different form of shredding mechanism.

The machine comprises a suitably constructed frame 10 having mounted thereon intermediate its ends a housing 11 in which are supported the shredding mechanisms, generally indicated by the numeral 12 and later to be described in detail. At one end of the frame 10 and on one side of the housing 11 the frame supports the bearing members 13 in which the main drive shaft 14 is journaled, said shaft carrying a drive pulley 15, which may be connected to any suitable source of power. One end of the shaft 14 projects beyond one of the bearings 13 and carries upon its projecting end the balance wheel 16. Secured to the portion of the shaft 14 between the outer bearing 13 and the wheel 16 is a gear 17 which meshes with the upper and lower gears 18 and 19 carried, respectively, by the shafts 20 and 21, which are also journaled in the bearings 13 and which extend through the adjacent wall of the housing 11 and carry at their extremities the shredding mechanisms 12. To further support the shafts 20 and 21 the same may be provided with thrust bearings 22 mounted in one wall of the housing 11. Thus, through the medium of the gears 17, 18 and 19, it will be obvious that rotation of the shaft 14 will be imparted to the shafts 20 and 21 to drive the same in the same direction and thus rotate the shredding mechanisms to shred the coconuts as the same are fed thereto, after which the shredded coconut is permitted to fall into a suitable receptacle located beneath the outlet end 23 of the housing 11.

Associated with each of the shredding mechanisms 12 is a cylinder 24 arranged on the side of the housing 11 opposite that on which the mechanism for rotating the shafts 20 and 21 is located and extending laterally from the housing, one end of the cylinder being disposed contiguous to the shredding mechanism. A section 25 of each cylinder adjacent the shredding mechanism is removably associated with the remaining portion of the cylinder and is utilized, as best illustrated in Figure 3, to secure a coconut engaging element 26 in operative position. This element 26 is preferably in the form of a plate and is disposed in a plane coincident with the diameter of the cylinder and in advance of the shredding mechanism as the coconut is fed to the latter. The forward end of the plate 26 is provided with a knife edge 27 which is designed to facilitate the penetration of the coconut as it is being fed to the shredding mechanism so that any movement of the coconut, except longitudinally of the cylinder, is prevented. The coconut will thus be held against movement similar to that imparted to the shredding mechanism so that said mechanism will be effective in shredding the coconut as the latter is fed thereto.

Each of the mechanisms 12 includes a head 28 having an opening 29 in which is disposed a plurality of angular bars 30 arranged radially with respect to the axis of rotation of the head 28 and provided upon the edge which projects beyond the head with a plurality of teeth 31 utilized to shred the coconut, as indicated in Figure 6. Each of the bars 30 is held in position by means of suitable clamping devices 32 secured to the head 28 by a screw 33. Associated with the teeth 31 of each bar is a cutting device 34 disposed in the opening 29 and extending diagonally therethrough with the cutting edge thereof arranged contiguous to the teeth 31 so that as the head 28 is rotated in the direction of the arrow, indicated in Figure 3, the cutting edge of the device 34 will sever the shredded portions of the coconut and permit such portions to pass through the opening 29 into the housing 11 and thence through the outlet 23 thereof.

In Figure 7 a slightly different form of shredding mechanism is disclosed, in which the shredding bars 30 are dispensed with and a cutting device 34' is mounted in the opening 29' of the head 28' and disposed in such position that the cutting edge thereof will cut the coconut into thin strips which will also fall into a receptacle beneath the outlet 23.

Each of the cylinders 24 is provided with a hopper 35 intermediate the ends thereof into which other coconuts may be deposited preparatory to the same being fed to the shredding mechanism. The means for feeding a coconut to the shredding mechanism preferably includes a plunger 36 mounted for reciprocation in each of the cylinders 24 and provided therein with a lateral opening 37, the outer end of which communicates with the hopper 35 when the plunger is in an advance position, as shown in Figure 5, so that any particles not capable of being shredded, such as portions of the shell which might accidentally be deposited in the hopper, will pass outwardly through the opening 37 instead of being wedged between the forward end of the plunger and the shredding mechanism. By reason of this construction, it will be obvious that possible damage to the shredding mechanism or other parts of the machine will be avoided.

Each plunger is provided with a rearwardly extending cover or hood 38 which is designed to overlap or cover the opening between the interior of the cylinder and the hopper 35 when the plunger 36 is in an advance position. By thus closing communication between the hopper and cylinder while one coconut is being shredded in said cylinder, it will be obvious that no other coconut will be permitted to enter the cylinder behind the plunger 36 during the course of a shredding operation. However, upon retraction of the plunger 36 after a coconut has been completely shredded the cover 38 and plunger will be moved to such a position as to permit another coconut to enter the cylinder 24 from the hopper.

The invention further contemplates the provision of means for reciprocating the plungers so that the same will alternately feed coconuts to the respective shredding mechanisms. To this end, each plunger is provided with a rod 39 having its forward end secured to the plunger by means of a set screw 40 and having mounted upon its rear end the forward end of a rack 41. The toothed edges of the racks 41 of the upper and lower plungers are opposed, as clearly shown in Figure 1, and the lower rack 41 is supported upon a roller 42 carried by the frame 10, while the upper rack is slidably mounted in a guide 43 carried by said frame. Secured on opposite sides of each rack 41 are guide plates 44 which extend longitudinally of the rack to prevent lateral movement thereof with respect to the oscillatory gear 45 mounted on the shaft 46 in the guide 43 and utilized to reciprocate said racks and consequently the plungers 36.

The mechanism for oscillating the gear 45 preferably comprises a disk 47 carried by the shaft 46 and having a pitman connection 48 with a similar disk 49 supported on the stub shaft 50. The stub shaft 50 also carries a worm wheel shown in dotted lines at 51, which is engaged by a worm 52 carried by one end of an operating shaft 53, which end is mounted in a suitable bearing 54. The shaft 53 extends longitudinally of the frame and has its other end mounted in a suitable bearing 55. The latter end of the shaft supports a gear 56 which meshes with a similar gear 57 carried by the main drive shaft 14 so that rotation of the latter shaft will be imparted to the shaft 53 to drive the gearing 51 and 52. It will thus be obvious that as the gear 51 is continuously rotated to drive the shaft 50 an oscillatory movement will be imparted from the rotating disk 49 through the pitman 48 to the disk 47 and consequently the gear 45, which latter element will then reciprocate the racks 41. By arranging the racks as shown in Figure 1, it will be apparent that as the plunger 36 in the upper cylinder is being advanced to engage a coconut in said cylinder and feed the same to the associated shredding mechanism, the plunger in the lower cylinder will be retracted by a movement of the associated rack 41 in an opposite direction.

The housing 11 may have a section thereof hinged at 58 so as to permit of access to the housing in order to make repairs to the shredding mechanism if found necessary. The bearings for the various shafts may be provided with closures 59 through which lubricant may be supplied to said bearings.

What is claimed is:

1. In a coconut shredding machine, a shredding mechanism, means for feeding coconuts thereto, and means controlled during an operation of said feeding means for preventing the feeding of more than one coconut to said shredding mechanism.

2. In a coconut shredding machine, a shredding mechanism, means for feeding coconuts to said shredding mechanism, a hopper from which the coconuts are fed to said feeding means, and means controlled by an operation of said feeding means for preventing more than one coconut being fed from the hopper to the feeding means.

3. In a coconut shredding machine, a plurality of shredding mechanisms, a cylinder associated with each mechanism, reciprocatory means in said cylinders for alternately feeding coconuts to said mechanisms, and means associated with said reciprocatory means for preventing the feeding of more than one coconut to said cylinders upon each operation of said reciprocatory means.

4. In a coconut shredding machine, a frame, a housing on said frame, shredding mechanisms in said housing, means arranged on one side of said housing for operating said shredding mechanisms, cylinders extending from the opposite side of said housing, reciprocating means in said cylinders for feeding coconuts to said shredding mechanisms, and means common to the last named means for alternately operating the same.

5. In a coconut shredding machine, a plurality of shredding mechanisms, a cylinder associated with each mechanism, reciprocating plungers in said cylinders for alternately feeding coconuts to said shredding mechanisms, racks connected to said plungers, an oscillatory member engageable with said racks for reciprocating the same, and means for oscillating said member.

6. In a coconut shredding machine, a plurality of shredding mechanisms, a cylinder associated with each mechanism, reciprocating plungers in said cylinders for alternately feeding coconuts to said shredding mechanisms, racks connected to said plungers, an oscillatory member engageable with said racks for reciprocating the same, a rotary member, a pitman connection between said rotary and oscillatory members for operating the latter, and a worm shaft and gear for actuating said rotary member.

7. In a coconut shredding machine, a cylinder into which a coconut to be shredded is deposited, a shredding mechanism in said cylinder, means for feeding the coconut longitudinally of said cylinder to said shredding mechanism, and means penetrating said coconut in advance of its engagement with said shredding mechanism for holding the same against movement similar to that of said shredding mechanism while the coconut is being shredded.

8. In a coconut shredding machine, a cylinder into which a coconut to be shredded is deposited, a shredding mechanism in said cylinder, means for feeding the coconut longitudinally of said cylinder to said shredding mechanism, and means arranged in the path of movement of the coconut as the same is fed longitudinally of said cylinder to penetrate said coconut and retain the same against any other than said longitudinal movement during the shredding operation.

9. In a coconut shredding machine, a shredding mechanism, a cylinder associated therewith and having a hopper for receiving coconuts to be fed to said shredding mechanism, means operable within said cylinder for feeding the coconuts to said mechanism, and means carried by the last named means to prevent the feeding of more than one coconut from said hopper to said cylinder upon each operation of said last named means.

10. In a coconut shredding machine, a shredding mechanism, a cylinder associated therewith and having a hopper for receiving coconuts to be fed to said shredding mechanism, means operable within said cylinder for feeding the coconuts to said mechanism, and a cover operated by the last named means for closing communication between said hopper and cylinder while a coconut is being fed to said shredding mechanism.

11. In a coconut shredding machine, a shredding mechanism, a cylinder associated therewith and having a hopper for receiving coconuts to be fed to said shredding mechanism, a reciprocating plunger in said cylinder for feeding coconuts to said mechanism, and a cover carried by said plunger for closing communication between said hopper and cylinder while the plunger is feeding a coconut to said mechanism.

12. In a coconut shredding machine, a shredding mechanism, a cylinder associated therewith, and a reciprocating plunger in said cylinder for feeding a coconut to said mechanism, said plunger having an opening therein into which unshreddable particles may enter as the plunger is feeding the coconut to said mechanism.

13. In a coconut shredding machine, a shredding mechanism, means for feeding a coconut to said mechanism, and means engageable with the coconut in advance of the shredding operation and with respect to which said coconut is movable as it is being shredded for preventing movement of said coconut similar to that of said shredding mechanism.

14. In a coconut shredding machine, a shredding mechanism, means for feeding a coconut to said mechanism, and means penetrating said coconut in advance of the shredding operation and with respect to which said coconut is movable as it is being shredded to hold said coconut against movement similar to that of said shredding mechanism.

15. In a coconut shredding machine, a shredding mechanism, a member operable to feed a coconut to said mechanism and having an opening therein into which unshreddable particles may enter as the member is feeding the coconut to said mechanism.

HENRY G. CODER.